United States Patent (10) Patent No.: US 11,537,142 B2
Li et al. (45) Date of Patent: Dec. 27, 2022

(54) METHOD FOR ROBOT REPOSITIONING

(71) Applicant: AMICRO SEMICONDUCTOR CO., LTD., Guangdong (CN)

(72) Inventors: Yongyong Li, Guangdong (CN); Gangjun Xiao, Guangdong (CN)

(73) Assignee: AMICRO SEMICONDUCTOR CO., LTD., Guangdong (CN)

( * ) Notice: Subject to any disclaimer, the term of this patent is extended or adjusted under 35 U.S.C. 154(b) by 257 days.

(21) Appl. No.: 16/982,068

(22) PCT Filed: Jan. 10, 2019

(86) PCT No.: PCT/CN2018/120198
§ 371 (c)(1),
(2) Date: Sep. 18, 2020

(87) PCT Pub. No.: WO2019/179176
PCT Pub. Date: Sep. 26, 2019

(65) Prior Publication Data
US 2021/0096580 A1 Apr. 1, 2021

(30) Foreign Application Priority Data
Mar. 19, 2018 (CN) .......................... 201810226498.1

(51) Int. Cl.
*G05D 1/02* (2020.01)
*G01S 17/931* (2020.01)

(52) U.S. Cl.
CPC .......... *G05D 1/0274* (2013.01); *G01S 17/931* (2020.01); *G05D 1/0214* (2013.01);
(Continued)

(58) Field of Classification Search
CPC .. G05D 1/0274; G05D 1/0214; G05D 1/0251; G05D 1/027; G05D 2201/0203;
(Continued)

(56) References Cited

U.S. PATENT DOCUMENTS

2011/0167574 A1 7/2011 Stout et al.
2016/0129593 A1* 5/2016 Wolowelsky .......... G05D 1/028
901/1
(Continued)

FOREIGN PATENT DOCUMENTS

CN 102138769 A 8/2011
CN 104731101 A * 6/2015
(Continued)

OTHER PUBLICATIONS

Machine Translation: CN-104731101-A (Year: 2015).*
(Continued)

*Primary Examiner* — Anne Marie Antonucci
*Assistant Examiner* — Connor L Knight
(74) *Attorney, Agent, or Firm* — Gang Yu

(57) ABSTRACT

A robot repositioning method is provided. A position deviation caused by excessive accumulation of a walking error of a robot may be corrected to implement repositioning by taking a path that the robot walks along an edge of an isolated object as a reference, so that the positioning accuracy and walking efficiency of the robot during subsequent navigation and walking are improved.

12 Claims, 3 Drawing Sheets

(52) U.S. Cl.
CPC ........... *G05D 1/0251* (2013.01); *G05D 1/027* (2013.01); *G05D 2201/0203* (2013.01)

(58) Field of Classification Search
CPC .. G05D 1/0238; G05D 1/0088; G01S 17/931; A47L 2201/04
See application file for complete search history.

(56) References Cited

U.S. PATENT DOCUMENTS

| | | | |
|---|---|---|---|
| 2017/0052033 | A1* | 2/2017 | Fong .................. G05D 1/0246 |
| 2017/0225891 | A1 | 8/2017 | Elazary et al. |
| 2018/0039275 | A1* | 2/2018 | Yun .................... A47L 9/2884 |
| 2018/0217611 | A1* | 8/2018 | Kim .................... A47L 9/2847 |

FOREIGN PATENT DOCUMENTS

| | | |
|---|---|---|
| CN | 105094125 A | 11/2015 |
| CN | 106066179 A | 11/2016 |
| CN | 106092104 A | 11/2016 |
| CN | 106323273 A | 1/2017 |
| CN | 106610665 A | 5/2017 |
| CN | 107037806 A | 8/2017 |
| CN | 107368071 A | 11/2017 |
| CN | 108508891 A | 9/2018 |
| EP | 3075685 A1 | 10/2016 |
| EP | 3184013 A1 | 6/2017 |
| JP | 2008077670 A | 4/2008 |
| WO | 2007051972 A1 | 5/2007 |

OTHER PUBLICATIONS

Yuanxun Fan et al: "Study on Boundary Creation and Identification and Localization Error Correction for Outdoor Area-covering Mobile Robots", Compound Semiconductors: Post-Conference Proceedings, 2003 Internation Al Symposium on San Diego, CA, USA Aug. 25-27, 2003, Piscataway, NJ, USA IEEE, Aug. 22, 2004(Aug. 22, 2004), pp. 665-670, XP010811098, DOI:10.1109/ROBIO.2004. 1521860 ISBN:978-0-7803-8614-3.

The extended European Search Report of the corresponding EP patent application No. 18910525.7, dated Aug. 27, 2021.

\* cited by examiner

METHOD FOR ROBOT REPOSITIONING

TECHNICAL FIELD

The present disclosure relates to the field of robots, and particularly to a robot repositioning method.

BACKGROUND

At present, in a sweeping process of a sweeping robot, a walking error may be generated for reasons like defects of a device such as a gyroscope or a code disc or ground slip, the error may be gradually accumulated, and the error accumulated for a long time may cause a great error of a map constructed by the robot. A relatively effective method in existing methods for solving such an error is to add a camera for visual positioning or adopt a laser radar for ranging positioning. However, these methods require relatively high hardware cost and are not suitable for popularization and application of sweeping robots.

SUMMARY

The disclosure provides a robot repositioning method. A position of a robot may be redetermined without any expensive device such as a camera or a laser radar to solve the problem of inaccurate positioning caused by excessive accumulation of a walking error of the robot and improve the robot positioning accuracy. The disclosure is implemented through the following specific technical solutions.

A robot repositioning method is provided, which may include the following steps: Step S1: a robot detects an obstacle, and step S2 is entered; Step S2: the robot walks along an edge of the obstacle, whether a path of walking along the edge of the obstacle meets a condition of determining that the obstacle is an isolated object, or not is judged, when the path does not meet the condition of determining that the obstacle is the isolated object, step S3 is entered, and when the path meets the condition of determining that the obstacle is the isolated object, step S4 is entered; Step S3: a walking angle of the robot is adjusted to leave the obstacle and continue walking, and when another obstacle is detected, step S2 is re-executed; Step S4: it is determined that the obstacle is the isolated object, an along-edge path of walking along an edge of the isolated object is recorded, whether the presently recorded along-edge path is similar to an along-edge path that is stored before or not is judged, when the presently recorded along-edge path is similar to the along-edge path that is stored before, step S5 is entered, and when the presently recorded along-edge path is not similar to the along-edge path that is stored before, step S6 is entered; Step S5: the recorded along-edge path of walking along the edge of the isolated object is determined as a stored along-edge path, and step S3 is re-executed; and step S6: the along-edge path that is stored before and similar to the presently recorded along-edge path is determined as a reference positioning path, a first local map where the present along-edge path is located and a second local map where the reference positioning path is located are determined, the first local map and second local map with the same shape and size are overlapped, at least one grid cell corresponding to a part, overlapping the reference positioning path in the second local map, in the present along-edge path in the first local map is determined as at least one positioning cell, and a grid coordinate presently detected when the robot is in each positioning cell is replaced with a grid coordinate of a corresponding grid cell in the reference positioning path.

In some embodiments, after step S1 and before step S2, the following steps may further be included: step S11: a corresponding grid coordinate when the robot detects the obstacle is determined; Step S12: an along-edge path stored by the robot in a preset time period counted back from present time point is determined; Step S13: whether the grid coordinate determined in step S11 is the same as or adjacent to a grid coordinate corresponding to the along-edge path determined In step S12 or not is judged, when the grid coordinate determined In step S11 is the same as or adjacent to a grid coordinate corresponding to the along-edge path determined In step S12, step S14 is entered, and when the grid coordinate determined In step S11 is not the same as or adjacent to a grid coordinate corresponding to the along-edge path determined In step S12, step S2 is entered; and step S14: the walking angle of the robot is adjusted to leave the obstacle and continue walking, and when another obstacle is detected, step S11 is re-executed, being adjacent In step S13 refers to that grid cells corresponding to the two grid coordinates have a common edge or an angular point.

In some embodiments, the operation In step S2 that the robot walks along the edge of the obstacle and whether the path along the edge of the obstacle meets the condition of determining that the obstacle is the isolated object or not is judged may include the following steps: Step S21: the robot walks along the edge of the obstacle, and starting information of a starting position point is recorded; Step S22: whether an angle change detected by the robot from the starting position point reaches 360° or not is judged, when the angle change reaches 360°, step S23 is entered, otherwise the robot continues walking along the edge of the obstacle until the angle change detected by the robot from the starting position point reaches 360° and step S23 is entered; Step S23: whether the robot returns to the starting position point In step S21 or not is judged, when the robot returns to the starting position point, it is determined that the path that the robot walks along the edge of the obstacle meets the condition of determining that the obstacle is the isolated object, otherwise step S24 is entered; and step S24: the robot continues walking along the edge of the obstacle, whether the robot returns to the starting position point In step S21 or not is judged, whether the angle change detected by the robot from the starting position point reaches 450° or not is judged, if the robot returns to the starting position point and the angle change does not reach 450°, it is determined that the path that the robot walks along the edge of the obstacle meets the condition of determining that the obstacle is the isolated object, and if the robot returns to the starting position point and the angle change exceeds 450° or the robot does not return to the starting position point and the angle change exceeds 450°, it is determined that the path that the robot walks along the edge of the obstacle does not meet the condition of determining that the obstacle is the isolated object.

In some embodiments, after step S21 and before step S22, the following steps may further be included: Step S211: a distance and angle change that the robot walks along the edge of the obstacle from the starting position point are detected; Step S212: whether the distance that the robot walks from the starting position point reaches 1.5 meters or not is judged, when the distance reaches 1.5 meters, step S213 is entered, and when the distance does not reach 1.5 meters, the robot continues walking until the walking distance of the robot reaches 1.5 meters and step S213 is entered; Step S213: whether the angle change that the robot walks from the starting position point reaches 90° or not is judged, when the angle change does not reach 90°, the robot adjusts the walking angle to leave the obstacle and continue walking and, when another obstacle is detected, step S11 is re-executed, and when the angle change reaches 90°, step S214 is entered; Step S214: the robot continues walking along the edge of the obstacle, whether the distance that the robot walks from the starting position point reaches 3 meters or not is judged, when the distance reaches 3 meters, step S215 is entered, and when the distance does not reach 3 meters, the robot continues walking until the walking distance of the robot reaches 3 meters and step S215 is entered; Step S215: whether the angle change that the robot walks from the starting position point reaches 180° or not is judged, when the angle change does not reach 180°, the robot adjusts the walking angle to leave the obstacle and continue walking and, when another obstacle is detected, step S11 is re-executed, and when the angle change reaches 180°, step S216 is entered; Step S216: the robot continues walking along the edge of the obstacle, whether the distance that the robot walks from the starting position point reaches 4.5 meters or not is judged, when the distance reaches 4.5 meters, step S217 is entered, and when the distance does not reach 4.5 meters, the robot continues walking until the walking distance of the robot reaches 4.5 meters and step S217 is entered; and step S217: whether the angle change that the robot walks from the starting position point reaches 270° or not is judged, when the angle change does not reach 270°, the robot adjusts the walking angle to leave the obstacle and continue walking and, when another obstacle is detected, step S11 is re-executed, and when the angle change reaches 270°, step S22 is entered.

In some embodiments, after step S21 and before step S22, the following steps may further be included: Step S211: a time period and angle change of walking, by the robot, along the edge of the obstacle from the starting position point are detected; Step S212: whether the time period of walking, by the robot, from the starting position point reaches 1 minute or not is judged, when the time period reaches 1 minute, step S213 is entered, and when the time period does not reach 1 minute, the robot continues walking until the time period of walking, by the robot, reaches 1 minute and step S213 is entered; Step S213: whether the angle change of walking, by the robot, from the starting position point reaches 90° or not is judged, when the angle change does not reach 90°, the robot adjusts the walking angle to leave the obstacle and continue walking and, when another obstacle is detected, step S11 is re-executed, and when the angle change reaches 90°, step S214 is entered; Step S214: the robot continues walking along the edge of the obstacle, whether the time period of walking, by the robot, from the starting position point reaches 2 minutes or not is judged, when the time period reaches 2 minutes, step S215 is entered, and when the time period does not reach 2 minutes, the robot continues walking until the time period of walking, by the robot, reaches 2 minutes and step S215 is entered; Step S215: whether the angle change that the robot walks from the starting position point reaches 180° or not is judged, when the angle change does not reach 180°, the robot adjusts the walking angle to leave the obstacle and continue walking and, when another obstacle is detected, step S11 is re-executed, and when the angle change reaches 180°, step S216 is entered; Step S216: the robot continues walking along the edge of the obstacle, whether the time period of walking, by the robot, from the starting position point reaches 3 minutes or not is judged, when the time period reaches 3 minutes, step S217 is entered, and when the time period does not reach 3 minutes, the robot continues walking until the walking time of the robot reaches 3 minutes and step S217 is entered; Step S217: whether the angle change that the robot walks from the starting position point reaches 270° or not is judged, when the angle change does not reach 270°, the robot adjusts the walking angle to leave the obstacle and continue walking and, when another obstacle is detected, step S11 is re-executed, and when the angle change reaches 270°, step S218 is entered; and step S218: the robot continues walking along the edge of the obstacle, whether the time period of walking, by the robot, from the starting position point reaches 4 minutes or not is judged, when the time period reaches 4 minutes, step S22 is entered, and when the time period does not reach 4 minutes, the robot continues walking until the walking time of the robot reaches 4 minutes and step S22 is entered.

In some embodiments, as described in step S23, after judging that the robot returns to the starting position point in step S21 and before determining that the path that the robot walks along the edge of the obstacle meets the condition of determining that the obstacle is the isolated object, or as described in step S24, after the robot returns to the starting position point and the angle change does not reach 450°, and before determining that the path that the robot walks along the edge of the obstacle meets the condition of determining that the obstacle is the isolated object, the following step may further be included: whether an area enclosed after the robot walks along the obstacle for a circle is larger than 0.3 square meters or not is judged, when the area is larger than 0.3 square meters, the step that it is determined that the path that the robot walks along the edge of the obstacle meets the condition of determining that the obstacle is the isolated object is entered, and c, the robot adjusts the walking angle to leave the obstacle and continue walking and, when another obstacle is detected, step S11 is re-executed.

In some embodiments, the operation In step S4 that the along-edge path of walking along the edge of the isolated object is recorded and whether the presently recorded along-edge path is similar to the along-edge path that is stored before or not is judged may include the following steps: Step S41: a grid coordinate of a grid cell corresponding to the present along-edge path is recorded, a grid area of a region enclosed by the present along-edge path is recorded, and a grid coordinate of a center grid cell of the region enclosed by the present along-edge path is recorded; Step S42: whether a coordinate difference value between the grid coordinate of the center grid cell of the region enclosed by the present along-edge path and a grid coordinate of a center grid cell of a region enclosed by the stored along-edge path is greater than a first preset coordinate difference value or not is judged, when the coordinate difference value is greater than the first preset coordinate difference value, it is determined that the presently recorded along-edge path is dissimilar to the along-edge path that is stored before, and when the coordinate difference value is not greater than the first preset coordinate difference value, step S43 is entered; Step S43: whether a difference value between the present grid area and a grid area of the region corresponding to the stored along-edge path is greater than a preset area difference value or not is judged, when the difference value is greater than the preset area difference value, it is determined that the presently recorded along-edge path is dissimilar to the along-edge path that is stored before, and when the difference value is not greater than the preset area difference value, step S44 is entered; Step S44: the first local map and second local map with the same shape and size are overlapped based on the first local map where the present along-edge path is located and the second local map where the stored along-edge path is located, whether a ratio of the number of overlapping grid cells of the present along-edge path and the stored along-edge path to the number of grid cells in the stored along-edge path is greater than a preset ratio value or not is judged, when the ratio of the number is greater than the preset ratio value, it is determined that the presently recorded along-edge path is similar to the along-edge path that is stored before, and when the ratio of the number is not greater than the preset ratio value, step S45 is entered; and Step S45: the present along-edge path is translated by a distance of N grid cells in upward, downward, left and rightward directions relative to the stored along-edge path respectively, whether the ratio of the number of the overlapping grid cells of the present along-edge path and the stored along-edge path to the number of the grid cells in the stored along-edge path is greater than the preset ratio value or not is judged, when the ratio of the number is greater than the preset ratio value, it is determined that the presently recorded along-edge path is similar to the along-edge path that is stored before, and when the ratio of the number is not greater than the preset ratio value, it is determined that the presently recorded along-edge path is dissimilar to the along-edge path that is stored before, N being a natural number and 1≤N≤3.

In some embodiments, the operation In step S44 or S45 that whether the ratio of the number of the overlapping grid cells of the present along-edge path and the stored along-edge path to the number of the grid cells in the stored along-edge path is greater than the preset ratio value or not is judged may include the following steps: based on the first local map where the present along-edge path is located and the second local map where the stored along-edge path is located, grid cells corresponding to the present along-edge path and the stored along-edge path are marked as 1, and other grid cells are marked as 0; an AND operation is executed on the corresponding grid cells in the first local map and the second local map; and whether a ratio of the number of grid cells marked as 1, obtained after the AND operation, to the number of the grid cells corresponding to the stored along-edge path is greater than the preset ratio value or not is judged.

In some embodiments, the operation In step S6 that the grid coordinate presently detected when the robot is in the positioning cell is replaced with the grid coordinate of the corresponding grid cell in the reference positioning path may include the following steps: Step S61: whether there are M tandem grid cells in the positioning cell or not is judged, and difference values between grid coordinates, presently recorded by the robot, of the M tandem grid cells and grid coordinates of corresponding grid cells in the reference positioning path being less than a second preset coordinate difference value or not is judged, when there are M tandem grid cells in the positioning cell and the difference values are less than the second preset coordinate difference value, step S62 is entered, and when there are not M tandem grid cells in the positioning cell and the difference values are not less than the second preset coordinate difference value, step S3 is entered; Step S62: the robot walks to any grid cell in the M tandem grid cells, and step S63 is entered; and Step S63: the presently detected grid coordinate is replaced with the grid coordinate of the corresponding grid cell in the reference positioning path, M being a natural number and 2≤M≤3.

In some embodiments, the operation In step S62 that the robot walks to any grid cell in the M tandem grid cells may include the following steps: Step S621: whether there is only one group of M tandem grid cells or not is judged, when there is only one group of M tandem grid cells, the robot directly walks to any grid cell in the M tandem grid cell and step S63 is entered, and when there are more than one group of M tandem grid cells, step S622 is entered; and Step S622: a group of M tandem grid cells of which recording time is earliest is determined, the robot walks to the grid cell of which recording time is earliest, and step S63 is entered.

In some embodiments, after step S6, the following steps may further be included: Step S71: it is determined that the grid coordinate presently detected when the robot is in the positioning cell is (X1, Y1), and step S72 is entered; Step S72: it is determined that the grid coordinate of the corresponding grid cell in the reference positioning path In step S6 is (X2, Y2), and step S73 is entered; Step S73: it is determined that a side length of the grid cell is L, and step S74 is entered; and Step S74: a coordinate value (x1, y1) detected by the robot at a present position point is replaced with (x2, y2), x2=x1−(X1−X2)*L and y2=y1−(Y1−Y2)*L.

In some embodiments, after step S6, the following steps may further be included: Step S71: it is determined that the coordinate value presently detected when the robot is at a center point of the positioning cell is (x1, y1); Step S72: it is determined that a coordinate value of a center point of the corresponding grid cell in the reference positioning path In step S6 is (x2, y2); and Step S73: the coordinate value (x1, y1) presently detected by the robot is replaced with (x2, y2).

The present disclosure has the following beneficial effects: by taking the path that the robot walks along the edge of the mutually isolated object as a reference, a position deviation caused by excessive accumulation of a walking error of the robot may be corrected to implement repositioning, so that the positioning accuracy and walking efficiency of the robot during subsequent navigation and walking are improved.

BRIEF DESCRIPTION OF THE DRAWINGS

FIG. 2 is a first schematic diagram after a first local map and a second local map are overlapped;

FIG. 3 is a second schematic diagram after a first local map and a second local map are overlapped; and FIG. 4 is a third schematic diagram after a first local map and a second local map are overlapped.

DETAILED DESCRIPTION OF THE EMBODIMENTS

Figure 1:
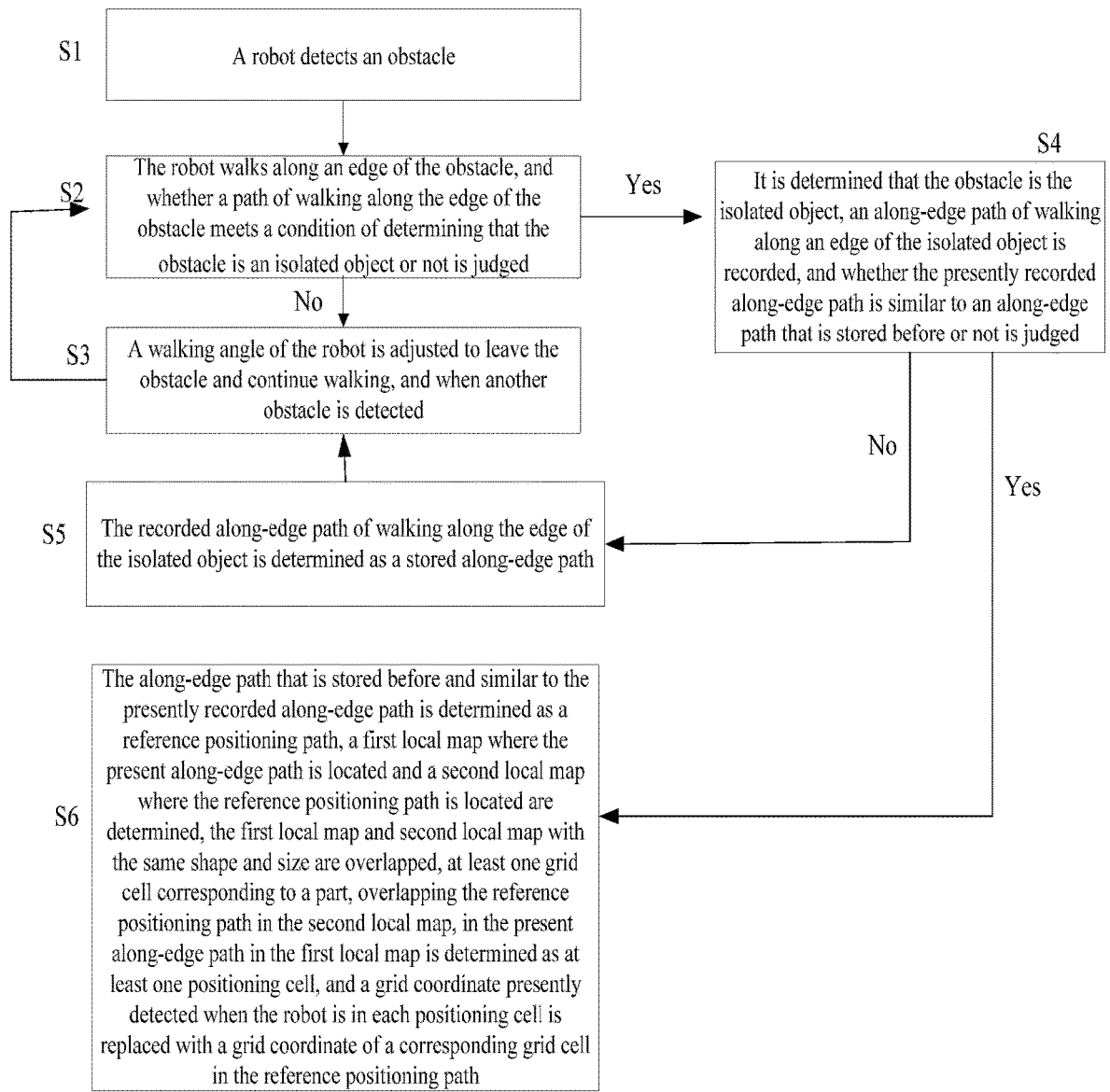
FIG. 1 is a flowchart of a robot repositioning method according to the disclosure.

The technical solutions in the embodiments of the disclosure will be described below in combination with the drawings in the embodiments of the disclosure in detail. It should be understood that the specific embodiments described below are adopted not to limit the disclosure but only to explain the disclosure.

A robot of the disclosure is an intelligent cleaning robot (for example, a sweeping robot or a mopping robot). All robots mentioned in the following embodiments refer to intelligent cleaning robots. These robots may automatically walk In some places by virtue of certain artificial intelligence. A body of the robot is provided with various sensors capable of detecting a walking distance, a walking angle (i.e., a proceeding direction), a body state, an obstacle and the like, for example, the robot may automatically turn in front of a wall or another obstacle, may walk along different routes as planned according to different settings and may also construct a grid map according to various data detected in a walking process, for example, marking a corresponding grid cell when an obstacle is detected as an obstacle cell, marking a corresponding grid cell when a cliff is detected as a cliff cell and marking a grid cell that the robot normally walks through as a passed cell. The robot of the disclosure includes the following structures: the body of the robot with a left driving wheel and a right driving wheel and capable of autonomously walking, a human-computer interaction interface arranged on the body and an obstacle detection unit arranged on the body. An inertia sensor is arranged in the body, and the inertia sensor includes an accelerometer, a gyroscope and the like. Odometers (usually code discs) configured to detect walking distances of the driving wheels are arranged on the two driving wheels, and a control module capable of processing a parameter of the related sensor and outputting a control signal to an execution component is also arranged.

Figures 2, 3:
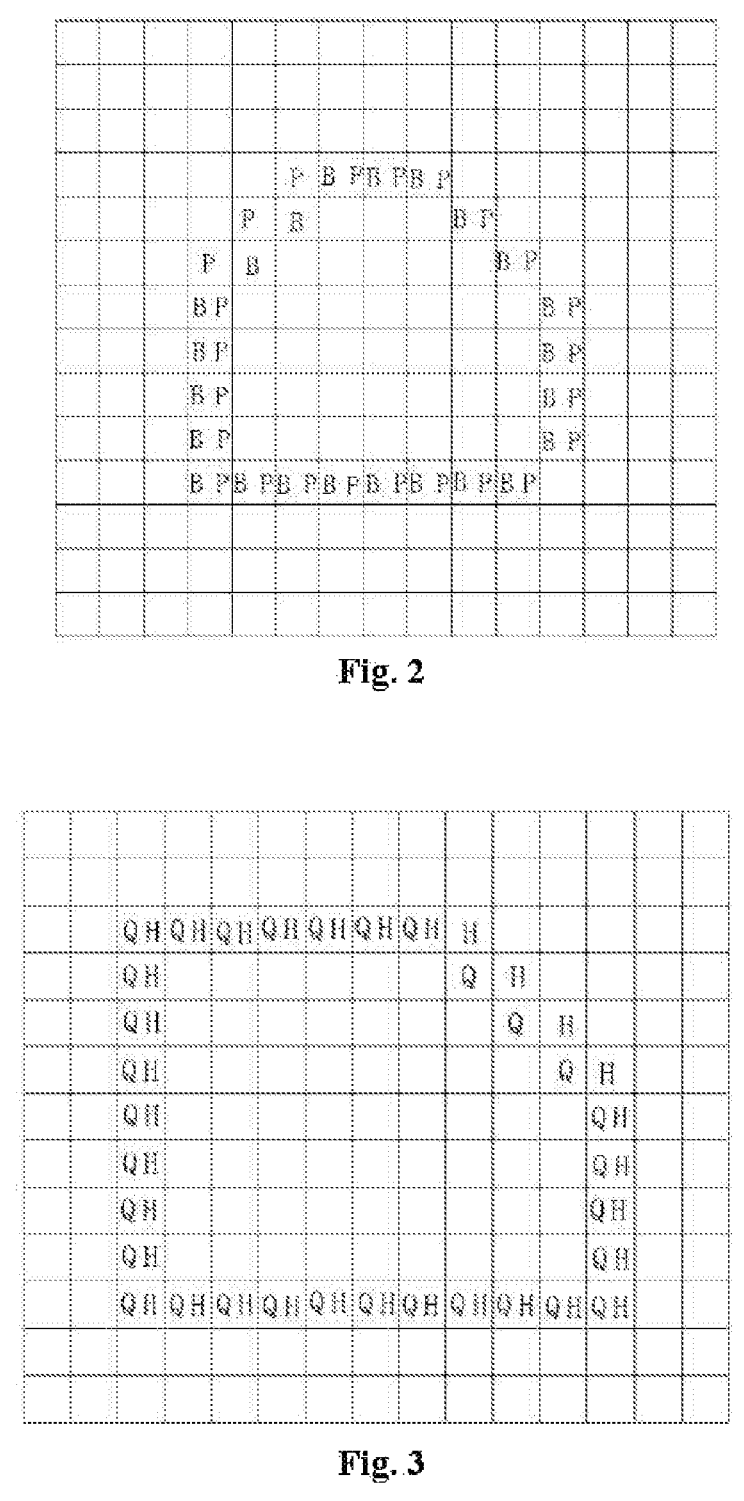

A robot repositioning method shown in FIG. 1 includes the following steps. In step S1, a robot detects walking data at the same time of walking, and when a collision sensor or infrared sensor at a front end of the robot detects an obstacle, step S2 is entered. After step S2 is entered, namely the robot walks along an edge of the obstacle and judges whether a path of walking along the edge of the obstacle meets a condition of determining that the obstacle is an isolated object or not. Specifically, the condition of determining that the obstacle is the isolated object may be correspondingly set according to different design requirements. For example, it may be judged according to a relationship between a starting position point where the robot starts walking along the edge of the obstacle and an ending position points where the robot stops walking along the edge of the obstacle, may also be judged according to a change of a turning angle in a certain time, may also be judged according to a relationship between a turning angle and a grid position, and may also be comprehensively judged by combining these factors. When the robot determines that the path of walking along the edge of the obstacle does not meet the condition, it may be learned that the obstacle is not the isolated object, repositioning may not be performed according to the obstacle and data related to the obstacle may also not be taken as a positioning reference. Therefore, step S3 is entered, namely the robot adjusts a walking angle to walk toward a direction far away from the obstacle to leave the obstacle. Then, the robot continues walking according to a path or manner planned by a system. When the collision sensor or infrared sensor at the front end of the robot detects another obstacle, step S2 is re-executed to continue judging whether the obstacle is an isolated object or not. In step S2, when the robot determines that the path of walking along the edge of the obstacle meets the condition of determining that the obstacle is the isolated object, step S4 is entered, namely the robot determines that the obstacle is the isolated object and records an along-edge path of walking along an edge of the isolated object. Recorded information may be correspondingly set according to the specific design requirement. For example, a grid coordinate corresponding to the along-edge path is recorded, an angle detected by a gyroscope when the robot walks in a grid cell corresponding to the along-edge path is recorded, and time when the robot is at a starting point of the along-edge path and time when the robot is at an ending point of the along-edge path are recorded. Then, the robot judges whether the presently recorded along-edge path is similar to an along-edge path that is stored before or not. A judgment manner may also be correspondingly set according to different design requirements. For example, grid coordinates of grid cells corresponding to the presently recorded along-edge path may be compared with grid coordinates of grid cells corresponding to the along-edge path that is stored before, and if only few grid coordinates are different, it may be considered that the two along-edge paths are similar. Or, differences between overall arrangement orientations of the grid cells corresponding to the presently recorded along-edge path and overall arrangement orientations of the grid cells corresponding to the along-edge path that is stored before may be determined, and if the arrangement orientations of only few points are different, it may be considered that the two along-edge paths are similar. Or, judgment may also be made through an angle change rate in a unit time in an along-edge walking process of the robot, a length of the along-edge path and total time of along-edge walking, and if these parameters are the same, it may be considered that the two along-edge paths are similar. Of course, these factors may also be combined for comprehensive judgment. If it is judged that the presently recorded along-edge path is dissimilar to the along-edge path that is stored before, it is indicated that the isolated object presently detected by the robot is not encountered before, no data related to walking along the edge of the isolated object is recorded as a repositioning reference and repositioning may not be performed by use of the isolated object. Therefore, step S5 is entered, namely the recorded along-edge path of walking along the edge of the isolated object is determined as a stored along-edge path to subsequently reposition the robot when the robot encounters the isolated object again, and then step S3 is re-executed. If it is judged that the presently recorded along-edge path is similar to the along-edge path that is stored before, it is indicated that the isolated object presently detected by the robot has been encountered before, related recorded data of the along-edge path of walking along the edge of the isolated object is stored and repositioning may be performed by use of the isolated object. Therefore, step S6 is entered, namely the along-edge path, stored before, of walking along the edge of the isolated object is a long determined as a reference positioning path. Then, a first local map where the present along-edge path is located and a second local map where the reference positioning path is located are determined, namely a part of map including the present along-edge path in a grid map is enclosed as the first local map and a part of map including the reference positioning path is enclosed as the second local map. Sizes and shapes of the first local map and the second local map are the same, but the specific size and shape may be correspondingly set according to the specific design requirement. For example, the shape is set to be a round, a square or a rectangle, a maximum grid coordinate of the local map is set to be larger than a maximum grid coordinate in the along-edge path by four grid cells, and a minimum grid coordinate of the local map is set to be smaller than a minimum grid coordinate in the along-edge path by four grid cells, etc. Next, the first local map and second local map with the same shape and size are overlapped. Since the present along-edge path is similar to the reference positioning path, a main difference there between is that grid coordinates are different, the overall shapes of the paths are almost the same and only few points are different, the first local map and the second local map may be overlapped to obtain the overlapping part of the present along-edge path and the reference positioning path. The overlapping part indicates that no error is generated when the robot walks along a present section of the edge of the isolated object and a grid coordinate corresponding to the present section of the edge may be adopted for repositioning. Some non-overlapping parts or points indicate that walking errors are generated when the robot walks at corresponding edge sections or edge points and are not suitable for use as a repositioning reference. Therefore, finally, at least one grid cell corresponding to a part, overlapping the reference positioning path in the second local map, in the present along-edge path in the first local map is determined as at least one positioning cell and a grid coordinate presently detected when the robot is in each positioning cell is replaced with a grid coordinate of a corresponding grid cell in the reference positioning path, thereby implementing repositioning of the robot. As shown in FIG. 2, FIG. 2 is a schematic diagram after a first local map and a second local map are overlapped. In the figure, each small check represents a grid cell, a path formed by connecting the checks marked with the letter P is the present along-edge path, a path formed by connecting the checks marked with the letter B is the reference positioning path, and a check that is marked with the letter P and also marked with the letter B indicates an overlapping part of the present along-edge path and the reference positioning path. It can be seen from FIG. 2 that only two or three points in left upper corners of the two along-edge paths are different and the paths mostly overlap, so that it may be learned that the two paths are similar. In addition, the robot may replace a presently detected grid coordinate with a stored grid coordinate in a corresponding check B at a position corresponding to any check including both B and P to implement repositioning of the robot. According to the disclosure, a position deviation caused by excessive accumulation of a walking error of the robot may be corrected to implement repositioning by taking the path that the robot walks along the edge of the isolated object as a reference, so that the positioning accuracy and walking efficiency of the robot during subsequent navigation and walking are improved.

As one implementation mode, after step S1 and before step S2, the following steps are further included. In step S11, a grid cell where the robot is located when the obstacle is detected and a grid coordinate corresponding to the grid cell are determined at first through data detected by the gyroscope and odometer of the robot. Then, step S12 is entered, namely an along-edge path stored by the robot in a preset time period counted back from present time point is determined. The preset time period may be correspondingly set according to the specific design requirement, may preferably be set to be any value in 10 minutes to 30 minutes, and is set to be 20 minutes in the embodiment. That is, 20 minutes are counted back from the present time point, and in the 20 minutes, the robot may search data in a memory for the along-edge path stored by the robot. After related data is determined, step S13 is entered. In step S13, the robot may compare and analyze the grid coordinate determined In step S11 and a grid coordinate corresponding to the along-edge path determined In step S12 one by one. If it is found that the two compared grid coordinates are the same or adjacent, it is considered that the present obstacle has been encountered in the 20 minutes and along-edge walking has been executed along the edge thereof, and if the robot frequently walks around the edge of the same obstacle in a relatively short time, the walking efficiency of the robot may be reduced. In addition, the accumulated error of the robot is yet not so great in a relatively short time interval, and repositioning is not required because frequent repositioning may also reduce the walking efficiency of the robot. Therefore, for achieving highest walking efficiency of the robot, when it is determined In step S13 that the grid coordinate determined In step S11 is the same as or adjacent to the grid coordinate corresponding to the along-edge path determined In step S12, step S14 is entered, namely the robot adjusts the walking angle to walk towards the direction far away from the obstacle to leave the obstacle. Then, the robot continues walking according to the path or manner planned by the system. When the collision sensor or infrared sensor at the front end of the robot detects another obstacle, step S11 is re-executed to restart judging whether the other detected obstacle meets a related requirement or not. If it is found by comparison and analysis of the grid coordinates that the two compared grid coordinates are different and also not adjacent, it is considered that the robot does not encounter the obstacle in the 20 minutes before the present time point, the robot has walked for a relatively long time and the accumulated error is also relatively great. Therefore, step S2 is entered to further judge whether the obstacle meets a repositioning condition of the robot or not. Being adjacent In step S13 refers to that the grid cells corresponding to the two grid coordinates have a common edge or an angular point. Through the method of the embodiment, whether the robot is required to walk along the edge of the object or not is judged according to a condition of the obstacle detected by the robot in the preset time point, so that the walking efficiency of the robot is improved, and blind and repeated actions of the robot are avoided.

As one implementation mode, the operation In step S2 that the robot walks along the edge of the obstacle and whether the path of walking along the edge of the obstacle meets the condition of determining that the obstacle is the isolated object or not is judged includes the following steps. In step S21, the robot walks along the edge of the obstacle, and starting information of a starting position point when the robot starts along-edge walking is recorded based on the data detected by the gyroscope and the odometer. The starting information may include information of a point coordinate value of the starting position point, a grid coordinate of a grid cell corresponding to the starting position point, a walking direction, time when walking is started and the like. The starting information may be recorded for a purpose of providing reference data for subsequently judging whether the obstacle is the isolated object or not or for a purpose of providing a navigation basis for subsequently searching the obstacle. After the starting information is recorded, step S22 is entered, namely whether a turning angle change of a body when the robot walks along the obstacle from the starting position point reaches 360° or not is judged based on the data detected by the gyroscope, and then whether the robot walks for a circle or not may be preliminarily judged. If it is preliminarily judged that the robot has walked for a circle, step S23 is directly entered for further confirmation. If it is preliminarily judged that the robot has not walked for a circle yet, the robot continues walking along the edge of the obstacle until the angle change detected by the robot from the starting position point reaches 360°, and then step S23 is entered for further confirmation. In step S23, the robot judges whether to return to the starting position point In step S21 or not at first. A judgment manner may be judging whether point coordinate values are the same or not. If it is detected that a point coordinate value of a present position point is the same as the point coordinate value of the starting position point, it is considered that the robot returns to the starting position point, so that it may be determined that the robot has walked along the edge of the obstacle for a circle. It may be learned through the along-edge walking path that the obstacle is the isolated object, namely the condition of determining that the obstacle is the isolated object is met. Then, step S4 may be entered for a next operation. Due to the influence of the walking error of the robot, when the gyroscope detects that the body has turned 360°, the robot has not completed walking along the edge of the obstacle for a circle yet and has not returned to the starting position point yet. When it is judged that the angle change detected by the robot from the starting position point reaches 360° but the robot does not return to the starting position point, step S24 is entered, namely the robot continues walking along the edge of the obstacle, whether the robot returns to the starting position point In step S21 or not is judged, and whether the angle change detected by the robot from the starting position point reaches 450° or not is judged. If the robot returns to the starting position point and the angle change does not reach 450°, it is indicated that the robot is really influenced by the error and may return to the starting position point in a range of 450°, it is indicated that the generated error is in an acceptable range, and it may be determined that the obstacle is the isolated object, namely the condition of determining that the obstacle is the isolated object is met. If the robot returns to the starting position point but the angle change exceeds 450° or the robot does not return to the starting position point and the angle change exceeds 450°, it is indicated that the obstacle is not the isolated object, and it is determined that the path that the robot walks along the edge of the obstacle does not meet the condition of determining that the obstacle is the isolated object. According to the method of the embodiment, whether the robot may completely walk around the obstacle for a circle or not may be judged accurately by combining the coordinate value and the turning angle of the robot to further accurately draw a conclusion about whether the path that the robot walks along the edge of the obstacle meets the condition of determining that the obstacle is the isolated object or not, and effective reference data may be provided for subsequent repositioning of the robot.

As one implementation mode, after step S21 and before step S22, the following steps are further included. In step S211, a distance and angle change that the robot walks along the edge of the obstacle from the starting position point are detected based on the odometer and the gyroscope. Then, step S212 is entered, namely whether the distance that the robot walks from the starting position point reaches 1.5 meters or not is judged, when the distance reaches 1.5 meters, step S213 is entered, and when the distance does not reach 1.5 meters, the robot continues walking until the walking distance of the robot reaches 1.5 meters and step S213 is entered. In step S213, whether the angle change that the robot walks from the starting position point reaches 90° or not is judged. When the angle change does not reach 90°, it is indicated that the obstacle occupies a relatively large area, has a relatively long edge route and is not suitable for use as a reference object for repositioning, so that the robot adjusts the walking angle to leave the obstacle and continue walking, and when another obstacle is detected, step S11 is re-executed to restart judging. If the robot walks by 1.5 meters and the turning angle reaches 90°, it may be preliminarily judged that the occupied area of the obstacle is appropriate, and it is necessary to enter step S214 for further judgment. In step S214, the robot continues walking along the edge of the obstacle, whether the distance that the robot walks from the starting position point reaches 3 meters or not is judged, when the distance reaches 3 meters, step S215 is entered, and when the distance does not reach 3 meters, the robot continues walking until the walking distance of the robot reaches 3 meters and step S215 is entered. In step S215, whether the angle change that the robot walks from the starting position point reaches 180° or not is judged. When the angle change does not reach 180°, it is indicated that an extension angle of first 1.5 meters of the edge route of the obstacle is relatively appropriate, an extension angle of the edge route from 1.5 meters to 3 meters is relatively large, it is very likely that the occupied area of the obstacle is also enlarged and the obstacle is not suitable for use as a reference object for repositioning, so that the robot adjusts the walking angle to leave the obstacle and continue walking, and when another obstacle is detected, step S11 is re-executed to restart judging. If the robot walks by 3 meters and the turning angle reaches 180°, it may substantially be obtained that the occupied area of the obstacle is appropriate. However, a shape of the obstacle is uncertain, it is further necessary to enter step S216 for final confirmation. In step S216, the robot continues walking along the edge of the obstacle, whether the distance that the robot walks from the starting position point reaches 4.5 meters or not is judged, when the distance reaches 4.5 meters, step S217 is entered, and when the distance does not reach 4.5 meters, the robot continues walking until the walking distance of the robot reaches 4.5 meters and step S217 is entered. In step S217, whether the angle change that the robot walks from the starting position point reaches 270° or not is judged. When the angle change does not reach 270°, it is indicated that an extension angle of first 3 meters of the edge route of the obstacle is relatively appropriate, an extension angle of the edge route from 3 meters to 4.5 meters is relatively large, it is very likely that the occupied area of the obstacle is also enlarged and the obstacle is not suitable for use as a reference object for repositioning, so that the robot adjusts the walking angle to leave the obstacle and continue walking, and when another obstacle is detected, step S11 is re-executed to restart judging. If the robot walks by 4.5 meters and the turning angle reaches 270°, it may be obtained that the occupied area of the obstacle is appropriate, and even though the other edge route changes greatly, a change range is only 90° and the whole size of the obstacle may not be influenced greatly, so that it may be finally confirmed that the occupied area of the obstacle is appropriate and is the best reference object for repositioning of the robot. According to the method of the embodiment, an occupied area condition of the obstacle may be judged accurately by combining a relationship between the distance and angle change of the path of walking along the edge of the obstacle, so that whether the obstacle is suitable for use as a reference object for repositioning of the robot or not may be effectively determined, and accurate reference data may be provided for subsequent repositioning of the robot.

As one implementation mode, after step S21 and before step S22, the following steps are further included. In step S211, time and angle change that the robot walks along the edge of the obstacle from the starting position point are detected based on a Real Time Clock (RTC) timing module and the gyroscope in the robot, and then step S212 is entered. In step S212, whether the time that the robot walks from the starting position point reaches 1 minute or not is judged. When the time period reaches 1 minute, it is indicated that the robot walks by a certain distance along the edge of the obstacle, and step S213 is entered. When the time period does not reaches 1 minute, the robot continues walking until the walking time of the robot reaches 1 minute and step S213 is entered. In step S213, whether the angle change that the robot walks from the starting position point reaches 90° or not is judged. When the angle change does not reach 90°, it is indicated that an occupied area, corresponding to a change of a walking trajectory of the robot along the edge of the obstacle, of the obstacle is relatively large and the obstacle area is not suitable for use as a reference object for repositioning, so that the robot adjusts the walking angle to leave the obstacle and continue walking, and when another obstacle is detected, step S11 is re-executed to restart judging. If the robot walks for 1 minute and the turning angle change reaches 90°, it may be preliminarily judged that the occupied area of the obstacle is appropriate, and it is necessary to enter step S214 for further judgment. In step S214, the robot continues walking along the edge of the obstacle, and whether the time that the robot walks from the starting position point reaches 2 minutes or not is judged. When the time period reaches 2 minutes, it is indicated that the robot has walked by a longer distance, and step S215 is entered. When the time period does not reach 2 minutes, the robot continues walking until the walking time of the robot reaches 2 minutes, and step S215 is entered. In step S215, whether the angle change that the robot walks from the starting position point reaches 180° or not is judged. When the angle change does not reach 180°, it is indicated that an extension angle of the edge route where the robot walks along the edge of the obstacle in the first minute, an extension angle of the edge route of walking along the edge of the obstacle in the second minute is relatively large, it is very likely that the occupied area of the obstacle is also enlarged and the obstacle is not suitable for use as a reference object for repositioning, so that the robot adjusts the walking angle to leave the obstacle and continue walking, and when another obstacle is detected, step S11 is re-executed to restart judging. If the robot walks for 2 minutes and the turning angle reaches 180°, it may substantially be obtained that the occupied area of the obstacle is appropriate. However, the shape of the obstacle is uncertain, it is further necessary to enter step S216 for further confirmation. In step S216, the robot continues walking along the edge of the obstacle, whether the time that the robot walks from the starting position point reaches 3 minutes or not is judged, when the time period reaches 3 minutes, step S217 is entered, and when the time period does not reach 3 minutes, the robot continues walking until the walking time of the robot reaches 3 minutes and step S217 is entered. In step S217, whether the angle change that the robot walks from the starting position point reaches 270° or not is judged. When the angle change does not reach 270°, it is indicated that an extension angle of the edge route where the robot walks along the edge of the obstacle in the first minute and the second minute, an extension angle of the edge route of walking along the edge of the obstacle in the third minute is relatively large, it is very likely that the occupied area of the obstacle is also enlarged and the obstacle is not suitable for use as a reference object for repositioning, so that the robot adjusts the walking angle to leave the obstacle and continue walking, and when another obstacle is detected, step S11 is re-executed to restart judging. If the robot walks for 3 minutes and the turning angle reaches 270°, it is indicated that an extension angle of the edge route where the robot walks along the edge of the obstacle in the first 3 minutes is relatively reasonable, and step S218 is entered, namely the robot continues walking along the edge of the obstacle and whether the time that the robot walks from the starting position point reaches 4 minutes or not is judged. When the time period reaches 4 minutes, step S22 is entered, namely whether the angle change detected by the robot from the starting position point reaches 360° or not is judged. Therefore, whether the robot walks 360° along the edge of the obstacle to implement along-edge walking of a circle or not may be judged. When the time period does not reach 4 minutes, the robot continues walking until the walking time of the robot reaches 4 minutes, and then step S22 is entered for judgment of 360°. According to the method of the embodiment, the occupied area condition of the obstacle may be judged accurately by analyzing the angle change of the robot in each time bucket, so that whether the obstacle is suitable for use as a reference object for repositioning of the robot or not may be effectively determined, and accurate reference data may be provided for subsequent repositioning of the robot.

As one implementation mode, as described in step S23, after judging that the robot returns to the starting position point in step S21 and before determining that the path that the robot walks along the edge of the obstacle meets the condition of determining that the obstacle is the isolated object, or as described in step S24, after the robot returns to the starting position point and the angle change does not reach 450°, and before determining that the path that the robot walks along the edge of the obstacle meets the condition of determining that the obstacle is the isolated object, the following step is further included: whether an area enclosed after the robot walks along the obstacle for a circle is larger than 0.3 square meters or not is judged; when the area is larger than 0.3 square meters, it is indicated that the occupied area of the obstacle is appropriate and the obstacle may be considered as a reference object for repositioning of the robot, and then the step that it is determined that the path that the robot walks along the edge of the obstacle meets the condition of determining that the obstacle is the isolated object is entered; and when the area is not larger than 0.3 square meters, the robot adjusts the walking angle to leave the obstacle and continue walking and, when another obstacle is detected, step S11 is re-executed to restart judging. An object used as a positioning reference of the robot should not be too large or too small; if the object is too large, the positioning time consumption is relatively high, and the efficiency is relatively low; and if the object is too small, positioning accuracy may not be ensured, and the effect is not ideal. Therefore, according to the method of the embodiment, there is specified such a restriction that the occupied area is larger than 0.3 square meters, so that an ideal isolated object may be selected as a reference for subsequent repositioning of the robot or storage of a new positioning parameter.

Figure 4:
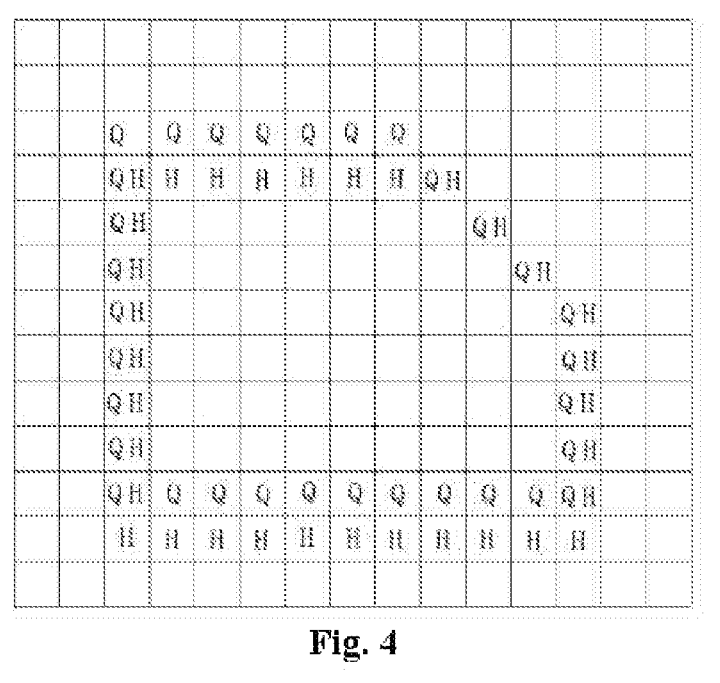

As one implementation mode, the operation In step S4 that the along-edge path of walking along the edge of the isolated object is recorded and whether the presently recorded along-edge path is similar to the along-edge path that is stored before or not is judged includes the following steps. In step S41, based on the data detected by the gyroscope and odometer of the robot, a grid coordinate of a grid cell corresponding to the present along-edge path is recorded, a grid area of a region enclosed by the present along-edge path is recorded, and a grid coordinate of a center grid cell of the region enclosed by the present along-edge path is recorded. Wherein, the grid coordinate may be converted according to a coordinate value of a position point, and the grid area may be calculated according to the number of grid cells. The grid coordinate of the center grid cell may be calculated according to upper, lower, left and right extreme grid coordinates in the region. For example, if a grid coordinate at an uppermost end of the region is (20, 30), a grid coordinate at a lowermost end is (8, 10), a grid coordinate at a leftmost end is (6, 12) and a grid coordinate at a rightmost end is (28, 22), the grid coordinate of the center grid cell is calculated to be (6+28−6)/2, 10+(30−10)/2)=(17, 20). The center does not only refer to the right center under a regular shape, and when the shape of the region is irregular, the grid coordinate calculated in the same manner may also be determined as the grid coordinate of the center grid unit of the region. After related data is recorded, step S42 is entered, namely whether a coordinate difference value between the grid coordinate of the center grid cell of the region enclosed by the present along-edge path and a grid coordinate of a center grid cell of a region enclosed by the stored along-edge path is greater than a first preset coordinate difference value or not is judged. The first preset coordinate difference value may be correspondingly set according to the specific design requirement, and may be set to be (2, 2) or (3, 3), namely whether a difference value between X values in the compared grid coordinates is greater than 2 or 3 or not and whether a difference value between Y values is greater than 2 or 3 or not are judged, when the difference value between X values in the compared grid coordinates is greater than 2 or 3, and the difference value between Y values is also greater than 2 or 3, it is determined that the coordinate difference value is greater than the first preset coordinate difference value, otherwise it is determined that the coordinate difference value is not greater than the first preset coordinate difference value. When it is judged that the coordinate difference value between the grid coordinate of the center grid cell of the region enclosed by the present along-edge path and the grid coordinate of the center grid cell of the region enclosed by the stored along-edge path is greater than the first preset coordinate difference value, it is indicated that differences between the upper, lower, left and right extreme grid coordinates of the regions enclosed by the two compared along-edge paths are relatively great, namely shapes of the two along-edge paths are greatly different, so that it may be determined that the presently recorded along-edge path is dissimilar to the along-edge path that is stored before. When it is judged that the coordinate difference value between the grid coordinate of the center grid cell of the region enclosed by the present along-edge path and the grid coordinate of the center grid cell of the region enclosed by the stored along-edge path is less than or equal to the first preset coordinate difference value, it is not always indicated that the two grid paths are similar, and it is necessary to enter step S43 for further judgment. In step S43, whether a difference value between the present grid area and a grid area of the region corresponding to the stored along-edge path is greater than a preset area difference value or not is judged. The preset area difference value may be correspondingly set according to the specific design requirement, and may be set to be an area of one to five grid cells. Due to the influence of the walking error, if the value is set too small, it is difficult to find an adapted object, and if the value is set too large, the accuracy of a found object is relatively low. Therefore, the value is set to be an area of three grid cells in the embodiment to achieve an optimal matching effect. For the grid area, the grid area may be obtained by adding the numbers of grid cells in each row or the numbers of grid cells in each column based on grid coordinate values of the grid cells corresponding to the along-edge path and then multiplying the sum by an area of each grid cell. If it is judged that the difference value between the present grid area and the grid area corresponding to the stored along-edge path is greater than the preset area difference value, it is indicated that shapes of the two regions are greatly different and the shapes of the two along-edge paths are also greatly different, so that it may be determined that the presently recorded along-edge path is dissimilar to the along-edge path that is stored before. If it is judged that the difference value between the present grid area and the grid area corresponding to the stored along-edge path is less than or equal to the preset area difference value, it is not always indicated that the two grid paths are similar, and it is necessary to enter step S44 for further judgment. In step S44, the first local map and second local map with the same shape and size are overlapped based on the first local map where the present along-edge path is located and the second local map where the stored along-edge path is located, and whether a ratio of the number of overlapping grid cells of the present along-edge path and the stored along-edge path to the number of grid cells in the stored along-edge path is greater than a preset ratio value or not is judged. The preset ratio value may be correspondingly set according to the specific design requirement, and is set to be 90% in the embodiment. As shown in FIG. 3, FIG. 3 is a schematic diagram after a first local map and a second local map are overlapped. Each of the selected first local map and second local map is a rectangular local map of which a length is a distance of 15 grid cells and a width is a distance of 13 grid cells in the grid map, and the two local maps include the grid cells corresponding to the along-edge paths. In the figure, each small check represents a grid cell, a path formed by connecting the checks marked with the letter H is the present along-edge path, a path formed by connecting the checks marked with the letter Q is the along-edge path that is stored before, and a check that is marked with the letter H and also marked with the letter Q indicates an overlapping part of the present along-edge path and the stored along-edge path. It can be seen from FIG. 3 that there are 29 overlapping grid cells and 32 grid cells marked with Q, and it is calculated that the ratio of the number of the overlapping grid cells of the present along-edge path and the stored along-edge path to the number of the grid cells in the stored along-edge path is 90.6%, greater than the preset ratio value 90%. It is indicated that the two along-edge paths mostly overlap and only three points in the right upper corners have some differences. Therefore, by comprehensive judgment, if the ratio of the number of the overlapping grid cells of the present along-edge path and the stored along-edge path to the number of the grid cells in the stored along-edge path is greater than the preset ratio value, it may finally be determined that the presently recorded along-edge path is similar to the along-edge path that is stored before. If the ratio of the number of the overlapping grid cells of the present along-edge path and the stored along-edge path to the number of the grid cells in the stored along-edge path is less than or equal to the preset ratio value, it is necessary to enter step S45 for further judgment. In step S45, the present along-edge path is translated by a distance of N grid cells in upward, downward, left and rightward directions relative to the stored along-edge path respectively, and whether the ratio of the number of the overlapping grid cells of the present along-edge path and the stored along-edge path to the number of the grid cells in the stored along-edge path is greater than the preset ratio value or not is judged. As shown in FIG. 4, FIG. 4 is another schematic diagram after a first local map and a second local map are overlapped. In the figure, each small check represents a grid cell, a path formed by connecting the checks marked with the letter H is the present along-edge path, a path formed by connecting the checks marked with the letter Q is the along-edge path that is stored before, and a check that is marked with the letter H and also marked with the letter Q indicates an overlapping part of the present along-edge path and the stored along-edge path. It can be seen from the figure that there are only 16 overlapping grid cells and a ratio of the number thereof to the number of the grid cells in the stored along-edge path is 50%, far less than the preset ratio value 90%. In such case, it is necessary to translate the whole along-edge path marked with H upwards by a distance of one grid cell to obtain an overlapping effect shown in FIG. 3. It may finally be determined by analysis over FIG. 3 that the presently recorded along-edge path is similar to the along-edge path that is stored before. If a ratio obtained after upward translation by the distance of one grid cell is still less than the preset ratio value, upward translation by one grid cell is continued to be executed, and a relationship between an obtained ratio and the preset ratio value is analyzed and judged again. If a result that the ratio is greater than the preset ratio value may not be obtained after translation by the distance of N grid cells, the original state shown in FIG. 4 is recovered. If the result that the ratio is greater than the preset ratio value may still not be obtained after downward translation by the distance of N grid cells, the original state shown in FIG. 4 is recovered again. By parity of reasoning, leftward and rightward translation by the distance of N grid cells is executed respectively, and if the result that the ratio is greater than the preset ratio value may not be obtained, it may be determined that the presently recorded along-edge path is dissimilar to the along-edge path that is stored before. In the translation process, if the result that the ratio is greater than the preset ratio value is obtained once by calculation, it may be determined that the presently recorded along-edge path is similar to the along-edge path that is stored before. N may be correspondingly set according to the specific design requirement. If the value is set too small, it is difficult to find an adapted object. If the value is set too large, an obtained object may have a relatively great error and is not suitable for use as an object for repositioning of the robot. Preferably, N is a natural number, and $1 \leq N \leq 3$. N=2 is set in the embodiment. According to the method of the embodiment, whether the presently recorded along-edge path is similar to the along-edge path that is stored before or not is judged in a grid cell overlapping manner, so that a relatively accurate judgment result may be obtained, and improvement of the accuracy of subsequent repositioning of the robot is facilitated.

As one implementation modes, the operation In step S44 or S45 that whether the ratio of the number of the overlapping grid cells of the present along-edge path and the stored along-edge path to the number of the grid cells in the stored along-edge path is greater than the preset ratio value or not is judged includes the following steps: based on the first local map where the present along-edge path is located and the second local map where the stored along-edge path is located, grid cells corresponding to the present along-edge path and the stored along-edge path are marked as 1, and other grid cells are marked as 0; an AND operation is executed on the corresponding grid cells in the first local map and the second local map, namely a result of 1 AND 1 is 1, a result of 1 AND 0 is 0 and a result of 0 AND 0 is also 0; and whether a ratio of the number of grid cells marked as 1, obtained after the AND operation, to the number of the grid cells corresponding to the stored along-edge path is greater than the preset ratio value or not is judged. According to the method of the embodiment, the grid cells are binarized and then analyzed in an AND operation manner, and In such a manner, the number of the overlapping grid cells in the two along-edge paths may be obtained rapidly and accurately, so that a result of whether the ratio of the number of the overlapping grid cells to the number of the grid cells corresponding to the stored along-edge path is greater than the preset ratio value or not may be obtained rapidly and accurately, and accurate reference data may be provided for subsequent positioning of the robot more efficiently. The preset ratio value and a related calculation manner are the same as those in the abovementioned embodiments and will not be elaborated herein.

As one implementation mode, the operation In step S6 that the grid coordinate presently detected when the robot is in the positioning cell is replaced with the grid coordinate of the corresponding grid cell in the reference positioning path includes the following steps. In step S61, whether there are M tandem grid cells in the positioning cell or not is judged, and difference values between grid coordinates, presently recorded by the robot, of the M tandem grid cells and grid coordinates of corresponding grid cells in the reference positioning path being less than a second preset coordinate difference value. A value of M may be correspondingly set according to the specific design requirement. M is a natural number, and $2 \leq M \leq 3$. M is set to be 3 in the embodiment. The second preset coordinate difference value may also be correspondingly set according to the specific design requirement, and is set to be (2, 2) in the embodiment. When difference values between, recorded by the robot, grid coordinate values of three continuously detected grid cells and grid coordinates of corresponding grid cells in the reference positioning path are less than the second preset coordinate difference value (2, 2), namely difference values between X values of recorded grid coordinates of the grid cells and X values of the grid coordinates of the corresponding grid cells in the reference positioning paths are less than 2 and difference values between Y values are also less than 2, it is indicated that a position difference between the two compared paths is not so great and they belong to objects of the same direction, and step S62 may be entered for subsequent positioning correction. Otherwise, it is indicated that the position difference between the two compared paths is relatively great, they may belong to objects of different directions and the objects may not be determined as positioning references, and it is necessary to re-execute step S3 to leave the present obstacle and look for another object that may be determined as a reference. In step S62, since errors of the three continuous grid cells are relatively small, the robot walks to any grid cell in the three tandem grid cells, and step S63 is entered, namely the presently detected grid coordinate is replaced with the grid coordinate of the corresponding grid cell in the reference positioning path, thereby implementing repositioning of the robot. The robot mainly judges whether the along-edge paths are similar or not in the abovementioned steps, and when there are two objects with the same occupied area and shape in a family environment, if the robot corrects positioning data only according to that the along-edge paths are similar, an error may be generated. Therefore, according to the method of the embodiment, whether a present object and an object corresponding to the reference positioning path are at the same position or not is further judged through the difference value between the detected and recorded grid coordinate of the along-edge path and the grid coordinate in the reference positioning path, to obtain more accurate positioning data and ensure higher positioning correction accuracy of the robot.

As one implementation mode, the operation In step S62 that the robot walks to any grid cell in the M tandem grid cells includes the following steps. In step S621, whether there is only one group of M tandem grid cells or not is judged. When the present object and the reference object are at the same position and in similar shapes, a relatively large number of grid coordinates are the same or adjacent, so that there may usually be multiple groups of M tandem grid cells, or there is only one group but the group includes many grid cells. If there is only one group, the robot directly walks to any grid cell in the three tandem grid cells, and step S63 is entered, namely the presently detected grid coordinate is replaced with the grid coordinate of the corresponding grid cell in the reference positioning path, thereby implementing repositioning of the robot. If there are multiple groups, step S622 is entered, namely a group of M tandem grid cells of which recording time is earliest is determined, the robot walks to the grid cell of which recording time is earliest, and step S63 is entered, namely the presently detected grid coordinate is replaced with the grid coordinate of the corresponding grid cell in the reference positioning path, thereby implementing repositioning of the robot. If the walking time of the robot is longer, the generated error is greater, so that the data recorded earlier is more accurate. According to the method of the embodiment, when the robot is positioned, the grid cell of which the time is earliest is selected for correction of the positioning data, so that the accuracy of the positioning data is further ensured, and the positioning accuracy of the robot is further ensured.

As one implementation mode, after step S6, the following steps are further included. In step S71, it is determined that the grid coordinate presently detected when the robot is in the positioning cell is (X1, Y1), and step S72 is entered. In step S72, it is determined that the grid coordinate of the corresponding grid cell in the reference positioning path In step S6 is (X2, Y2), and step S73 is entered. In step S73, it is determined that a side length of the grid cell is L, and step S74 is entered. In step S74, a coordinate value (x1, y1) detected by the robot at a present position point is replaced with (x2, y2), $x2=x1-(X1-X2)*L$ and $y2=y1-(Y1-Y2)*L$. There is made such a hypothesis that (X1=10, Y1=20), (X2=12, Y2=21), L=20 cm and the coordinate value detected by the robot at the present position point is (x1=208, y1=412). In such case, (x2=248, y2=432) is calculated, and it is obtained by replacement that the coordinate value of the robot at the present position point is (248, 432). During navigation and walking, the robot finds a grid path at first and then walks to position points one by one along the grid path. Therefore, according to the method of the embodiment, after positioning correction of the grid coordinates, the robot is further required to correct coordinate values of specific position points, and In such a manner, the navigation and walking accuracy and efficiency of the robot may be ensured.

As one implementation mode, after step S6, the following steps are further included. In step S71, it is determined based on the data detected by the gyroscope and the odometer that the coordinate value presently detected when the robot is at a center point of the positioning cell is (x1, y1), and step S72 is entered. In step S72, it is determined based on corresponding saved data in the stored path that a coordinate value of a center point of the corresponding grid cell in the reference positioning path In step S6 is (x2, y2), and step S73 is entered. In step S73, the coordinate value ((x1, y1)) presently detected by the robot is replaced with (x2, y2). Through the method of adopting the stored data for direct replacement, the coordinate values of the specific position points may be corrected more efficiently, and the navigation and walking accuracy and efficiency of the robot are ensured.

In all the above embodiments, the grid cell refers to a virtual check of which a side length is 20 centimeters, and a map formed by many continuously arranged grid cells, having a certain length and width and configured to represent geographical environmental information is a grid map. According to the grid map, the robot may know a position of a present grid cell from the data detected at the same time of walking and update a state of the grid cell in real time, for example, marking a state of a grid cell it smoothly walks through to be passed, marking a grid cell colliding with an obstacle to be obstacle, marking a state of a grid cell where a cliff is detected to be cliff and marking a state of a grid cell it does not reach to be unknown. In addition, the isolated object in all the above embodiments refers to an independent object not close to a wall or not close to an object against the wall, and the robot may walk along an edge of the independent object for a circle. Wherein the independent object not only refers to a single object, and multiple objects that are close and may form a continuous occupied area may also be considered as an independent object. Moreover, the along-edge path that is stored before in all the above embodiments refers to an along-edge path, which has been stored in the memory of the system of the robot, of walking an edge of an another isolated object meeting a certain condition, and a grid coordinate of a grid cell corresponding to the along-edge path, a grid coordinate of a grid cell corresponding to an along-edge starting position point, a grid coordinate of a grid cell corresponding to an along-edge ending position point, along-edge starting time, along-edge ending time and the like are stored. The data stored in the memory may not be deleted at will and may be adopted as reference data for repositioning of the robot. The presently recorded along-edge path refers to an along-edge path, which is temporally saved in a buffer of the system of the robot, of walking an edge of a present obstacle, and a grid coordinate of a grid cell corresponding to the along-edge path, a grid coordinate of a grid cell corresponding to an along-edge starting position point, a grid coordinate of a grid cell corresponding to an along-edge ending position point, along-edge starting time, along-edge ending time and the like are saved. The data saved in the buffer, if meeting a requirement of serving as reference data for repositioning of the robot, may be stored in the memory as the stored along-edge path, and if not meeting the requirement, may be covered by subsequently recorded new data.

It can be understood by those of ordinary skill in the art that all or part of steps implementing each method embodiment may be completed through related hardware instructed by a program. The program may be stored in a computer-readable storage medium (for example, various media capable of storing a program code such as a Read-Only Memory (ROM), a Random Access Memory (RAM), a magnetic disk or an optical disk). The program is executed to execute the steps of each method embodiment.

It is finally to be noted that each embodiment in the specification is described progressively, differences with the other embodiments are mainly described in each embodiment, the same or similar parts of each embodiment may refer to each other and the technical solutions of each embodiment may be mutually combined. The above embodiments are adopted not to limit but only to describe the technical solutions of the disclosure. Although the disclosure is described with reference to each embodiment in detail, those of ordinary skill in the art may also modify the technical solutions recorded in each embodiment or equivalently replace part or all of the technical features therein, and the technical solutions corresponding to these modifications or replacements do not depart from the scope of the technical solutions of each embodiment of the disclosure.

What is claimed is:

1. A method for repositioning a robot, comprising the following steps:

Step S1: detecting, by the robot, an obstacle, and entering step S2;

Step S2: walking along an edge of the obstacle, judging whether a path along the edge of the obstacle meets a condition of determining that the obstacle is an isolated object or not, when the path does not meet the condition of determining that the obstacle is the isolated object, entering step S3, and when the path meets the condition of determining that the obstacle is the isolated object, entering step S4;

Step S3: adjusting a walking angle of the robot to leave the obstacle and continue walking, and when another obstacle is detected, re-executing step S2;

Step S4: determining that the obstacle is the isolated object, recording an along-edge path walking along an edge of the isolated object, judging whether the presently recorded along-edge path is similar to an along-edge path that is stored before or not, when the presently recorded along-edge path is not similar to the along-edge path that is stored before, entering step S5, and when the presently recorded along-edge path is not similar to the along-edge path that is stored before, entering step S6;

Step S5: determining the recorded along-edge path walking along the edge of the isolated object as a stored along-edge path, and jumping to step S3; and Step S6: determining the along-edge path that is stored before and similar to the presently recorded along-edge path as a reference positioning path, determining a first local map where the present along-edge path is located and a second local map where the reference positioning path is located, overlapping the first local map and the second local map with a same shape and size, determining a grid cell at a same location in the reference positioning path and the present along-edge path as a positioning cell, overlapping the reference positioning path in the second local map, in the present along-edge path in the first local map as at least one positioning cell, and replacing a grid coordinate value presently detected when the robot is in each positioning cell with a grid coordinate value of a corresponding grid cell in the reference positioning path;

after step S1 and before step S2, the method further comprising the following steps:

Step S11: determining a corresponding grid coordinate value when the robot detects the obstacle;

Step S12: determining an along-edge path stored by the robot in a preset time period counted back from a present time point;

Step S13: judging whether the grid coordinate value determined in step S11 is the same as or adjacent to a grid coordinate value corresponding to the along-edge path determined in step S12 or not, when the grid coordinate value determined in step S11 is the same as or adjacent to the grid coordinate value corresponding to the along-edge path determined in step S12, entering step S14, and when the grid coordinate value determined in step S11 is not the same as or adjacent to the grid coordinate value corresponding to the along-edge path determined in step S12, entering step S2; and Step S14: adjusting the walking angle of the robot to leave the obstacle and continue walking, and when another obstacle is detected, re-executing step S11, wherein the adjacent mentioned when two grid cells corresponding to the two grid coordinates have a common edge or an angular point, they are considered adjacent.

2. The method as claimed in claim 1, wherein walking along the edge of the obstacle and judging whether the path along the edge of the obstacle meets the condition of determining that the obstacle is the isolated object or not in step S2 comprises the following steps:

Step S21: walking along the edge of the obstacle, and recording starting information of a starting position point;

Step S22: judging whether an angle change detected by the robot from the starting position point reaches 360° or not, when the angle change reaches 360°, entering step S23, otherwise continue walking along the edge of the obstacle until the angle change detected by the robot from the starting position point reaches 360° and entering step S23;

Step S23: judging whether the robot returns to the starting position point described in step S21 or not, when the robot returns to the starting position point, determining that the path that the robot walks along the edge of the obstacle meets the condition of determining that the obstacle is the isolated object, otherwise entering step S24; and Step S24: continuing walking along the edge of the obstacle, judging whether the robot returns to the starting position point described in step S21 or not, and judging whether the angle change detected by the robot from the starting position point reaches 450° or not, if the robot returns to the starting position point and the angle change does not reach 450°, determining that the path that the robot walks along the edge of the obstacle meets the condition of determining that the obstacle is the isolated object, and if the robot returns to the starting position point and the angle change exceeds 450°, or the robot does not return to the starting position point and the angle change exceeds 450°, determining that the path that the robot walks along the edge of the obstacle does not meet the condition of determining that the obstacle is the isolated object.

3. The method as claimed in claim 2, after step S21 and before step S22, further comprising the following steps:

Step S211: detecting a distance and angle change that the robot walks along the edge of the obstacle from the starting position point;

Step S212: judging whether the distance that the robot walks from the starting position point reaches 1.5 meters or not, when the distance reaches 1.5 meters, entering step S213, and when the distance does not reach 1.5 meters, controlling the robot to continue walking until the walking distance of the robot reaches 1.5 meters and entering step S213;

Step S213: judging whether the angle change that the robot walks from the starting position point reaches 90° or not, when the angle change does not reach 90°, adjusting, by the robot, the walking angle to leave the obstacle and continue walking and, when another obstacle is detected, re-executing step S11, and when the angle change reaches 90°, entering step S214;

Step S214: controlling the robot to continue walking along the edge of the obstacle, judging whether the distance that the robot walks from the starting position point reaches 3 meters or not, when the distance reaches 3 meters, entering step S215, and when the distance does not reach 3 meters, controlling the robot to continue walking until the walking distance of the robot reaches 3 meters and entering step S215;

Step S215: judging whether the angle change of walking, by the robot, from the starting position point reaches 180° or not, when the angle change does not reach 180°, adjusting, by the robot, the walking angle to leave the obstacle and continue walking and, when another obstacle is detected, re-executing step S11, and when the angle change reaches 180°, entering step S216;

Step S216: controlling the robot to continue walking along the edge of the obstacle, judging whether the distance of walking, by the robot, from the starting position point reaches 4.5 meters or not, when the distance reaches 4.5 meters, entering step S217, and when the distance does not reach 4.5 meters, controlling the robot to continue walking until the walking distance of the robot reaches 4.5 meters and entering step S217; and Step S217: judging whether the angle change of walking, by the robot, from the starting position point reaches 270° or not, when the angle change does not reach 270°, adjusting, by the robot, the walking angle to leave the obstacle and continue walking and, when another obstacle is detected, re-executing step S11, and when the angle change reaches 270°, entering step S22.

4. The method as claimed in claim 2, after step S21 and before step S22, further comprising the following steps:

Step S211: detecting a time period and angle change of walking, by the robot, along the edge of the obstacle from the starting position point;

Step S212: judging whether the time period of walking, by the robot, from the starting position point reaches 1 minute or not, when the time period reaches 1 minute, entering step S213, and when the time period does not reach 1 minute, controlling the robot to continue walking until the time period of walking, by the robot, reaches 1 minute and entering step S213;

Step S213: judging whether the angle change of walking, by the robot, from the starting position point reaches 90° or not, when the angle change does not reach 90°, adjusting, by the robot, the walking angle to leave the obstacle and continue walking and, when another obstacle is detected, re-executing step S11, and when the angle change reaches 90°, entering step S214;

Step S214, controlling the robot to continue walking along the edge of the obstacle, judging whether the time period of walking, by the robot, from the starting position point reaches 2 minutes or not, when the time period reaches 2 minutes, entering step S215, and when the time period does not reach 2 minutes, controlling the robot to continue walking until the time period of walking, by the robot, reaches 2 minutes and entering step S215;

Step S215: judging whether the angle change that the robot walks from the starting position point reaches 180° or not, when the angle change does not reach 180°, adjusting, by the robot, the walking angle to leave the obstacle and continue walking and, when another obstacle is detected, re-executing step S11, and when the angle change reaches 180°, entering step S216;

Step S216, controlling the robot to continue walking along the edge of the obstacle, judging whether the time period of walking, by the robot, from the starting position point reaches 3 minutes or not, when the time period reaches 3 minutes, entering step S217, and when the time period does not reach 3 minutes, controlling the robot to continue walking until the time period of walking, by the robot, reaches 3 minutes and entering step S217;

Step S217: judging whether the angle change that the robot walks from the starting position point reaches 270 or not, when the angle change does not reach 270°, adjusting, by the robot, the walking angle to leave the obstacle and continue walking and, when another obstacle is detected, re-executing step S11, and when the angle change reaches 270°, entering step S218; and Step S218, controlling the robot to continue walking along the edge of the obstacle, judging whether the time period of walking, by the robot, from the starting position point reaches 4 minutes or not, when the time period reaches 4 minutes, entering step S22, and when the time period does not reach 4 minutes, controlling the robot to continue walking until the time period of walking, by the robot, reaches 4 minutes and entering step S22.

5. The method as claimed in claim 2, as described in step S23, after judging that the robot returns to the starting position point in step S21 and before determining that the path that the robot walks along the edge of the obstacle meets the condition of determining that the obstacle is the isolated object, or as described in step S24, after the robot returns to the starting position point and the angle change does not reach 450°, and before determining that the path that the robot walks along the edge of the obstacle meets the condition of determining that the obstacle is the isolated object, further comprising the following step:

judging whether an area enclosed after the robot walks along the obstacle for a circle is larger than 0.3 square meters or not, when the area is larger than 0.3 square meters, entering the step of determining that the path that the robot walks along the edge of the obstacle meets the condition of determining that the obstacle is the isolated object, and when the area is not larger than 0.3 square meters, adjusting, by the robot, the walking angle to leave the obstacle and continue walking and, when another obstacle is detected, re-executing step S11.

6. The method as claimed in claim 1, wherein recording the along-edge path of walking along the edge the isolated object and judging whether the presently recorded along-edge path is similar to the along-edge path that is stored before or not in step S4 comprises the following steps:

Step S41: recording a grid coordinate value of a grid cell corresponding to the present along-edge path, recording a grid area of a region enclosed by the present along-edge path, and recording a grid coordinate value of a center grid cell of the region enclosed by the present along-edge path;

Step S42: judging whether a coordinate difference value between the grid coordinate value of the center grid cell of the region enclosed by the present along-edge path and a grid coordinate value of a center grid cell of a region enclosed by the stored along-edge path is greater than a first preset coordinate difference value or not, when the coordinate difference value is greater than the first preset coordinate difference value, determining that the presently recorded along-edge path is dissimilar to the stored along-edge path, and when the coordinate difference value is not greater than the first preset coordinate difference value, entering step S43;

Step S43: judging whether a difference value between the present grid area and a grid area of the region corresponding to the stored along-edge path is greater than a preset area difference value or not, when the difference value is greater than the preset area difference value, determining that the presently recorded along-edge path is dissimilar to the along-edge path that is stored before, and when the difference value is not greater than the preset area difference value, entering step S44;

Step S44: overlapping the first local map and the second local map with the same shape and size based on the first local map where the present along-edge path is located and the second local map where the stored along-edge path is located, judging whether a ratio of a number of overlapping grid cells of the present along-edge path and the stored along-edge path to a number of grid cells in the stored along-edge path is greater than a preset ratio value or not, when the ratio of the number is greater than the preset ratio value, determining that the presently recorded along-edge path is similar to the along-edge path that is stored before, and when the ratio of the number is not greater than the preset ratio value, entering step S45; and Step S45: translating the present along-edge path by a distance of N grid cells in upward, downward, left and rightward directions relative to the stored along-edge path respectively, judging whether the ratio of the number of the overlapping grid cells of the present along-edge path and the stored along-edge path to the number of the grid cells in the stored along-edge path is greater than the preset ratio value or not, when the ratio of the number is greater than the preset ratio value, determining that the presently recorded along-edge path is similar to the along-edge path that is stored before, and when the ratio of the number is not greater than the preset ratio value, determining that the presently recorded along-edge path is dissimilar to the along-edge path that is stored before, N being a natural number and $1 \leq N \leq 3$.

7. The method as claimed in claim 6, wherein as described in step S44 and step S45, judging whether the ratio of the number of the overlapping grid cells of the present along-edge path and the stored along-edge path to the number of the grid cells in the stored along-edge path is greater than the preset ratio value or not comprises the following steps:

based on the first local map where the present along-edge path is located and the second local map where the stored along-edge path is located, marking grid cells corresponding to the present along-edge path and the stored along-edge path as 1, and marking other grid cells as 0;

executing an AND operation on the corresponding grid cells in the first local map and the second local map; and judging whether a ratio of the number of grid cells marked as 1, obtained after the AND operation, to the number of the grid cells corresponding to the stored along-edge path is greater than the preset ratio value or not.

8. The method as claimed in claim 7, wherein replacing the grid coordinate value presently detected when the robot is in the positioning cell with the grid coordinate value of the corresponding grid cell in the reference positioning path in step S6 comprises the following steps:

Step S61: judging whether there are M tandem grid cells in the positioning cell or not, and difference values between grid coordinates of the M tandem grid cells presently recorded by the robot, and grid coordinates of corresponding grid cells in the reference positioning path being less than a second preset coordinate difference value, when there are M tandem grid cells in the positioning cell and the difference values are less than the second preset coordinate difference value, entering step S62, and when there are not M tandem grid cells in the positioning cell and the difference values are not less than the second preset coordinate difference value, entering step S3, tandem grid cells mean that grid cells next to each other on the grid;

Step S62: controlling the robot to walk to any grid cell in the M tandem grid cells, and entering step S63; and Step S63: replacing the presently detected grid coordinate value with the grid coordinate value of the corresponding grid cell in the reference positioning path, M being a natural number and $2 \leq M \leq 3$.

9. The method as claimed in claim 6, wherein replacing the grid coordinate value presently detected when the robot is in the positioning cell with the grid coordinate value of the corresponding grid cell in the reference positioning path in step S6 comprises the following steps:

Step S61: judging whether there are M tandem grid cells in the positioning cell or not, and difference values between grid coordinates of the M tandem grid cells presently recorded by the robot; and grid coordinates of corresponding grid cells in the reference positioning path being less than a second preset coordinate difference value, when there are M tandem grid cells in the positioning cell and the difference values are less than the second preset coordinate difference value, entering step S62, and when there are not M tandem grid cells in the positioning cell and the difference values are not less than the second preset coordinate difference value, entering step S3, tandem grid cells mean that grid cells next to each other on the grid;

Step S62: controlling the robot to walk to any grid cell in the M tandem grid cells, and entering step S63; and Step S63: replacing the presently detected grid coordinate value with the grid coordinate value of the corresponding grid cell in the reference positioning path, M being a natural number and $2 \leq M \leq 3$.

10. The method as claimed in claim 9, wherein controlling the robot to walk to any grid cell in the M tandem grid cells in step S62 comprises the following steps:

Step S621: judging whether there is only one group of M tandem grid cells or not, when there is the only one group of M tandem grid cells, directly walking to any grid cell in the M tandem grid cell and entering step S63, and when there are more than one group of M tandem grid cells, entering step S622; and Step S622: determining a group of M tandem grid cells of which recording time is earliest, controlling the robot to walk to a grid cell of which recording time is earliest, and entering step S63.

11. The method as claimed in claim 1, after step S6, further comprising the following steps:

Step S71: as described in step S6, determining that the grid coordinate value presently detected when the robot is in the positioning cell is (X1, Y1), and entering step S72;

Step S72: as described in step S6, determining that the grid coordinate value of the corresponding grid cell in the reference positioning path is (X2, Y2), and entering step S73;

Step S73: determining that a side length of the grid cell is L, and entering step S74; and Step S74: replacing a coordinate value (x1, y1) detected by the robot at a present position point with (x2, y2), $x2=x1-(X1-X2)L$ and $y2=y1-(Y1-Y2)L$.

12. The method as claimed in claim 1, after step S6, further comprising the following steps:

Step S71: determining that a coordinate value presently detected when the robot is at a center point of the positioning cell in step S6 is (x1, y1);

Step S72: determining that a coordinate value of a center point of the corresponding grid cell in the reference positioning path in step S6 is (x2, y2); and Step S73: replacing the coordinate value (x1, y1) presently detected by the robot with (x2, y2).

* * * * *